M. NAGLE.
ASH BARREL HOLDER.
APPLICATION FILED NOV. 6, 1912.

1,091,008.

Patented Mar. 24, 1914.

Witnesses:
N. C. Lombard
Mary C. Smith

Inventor:
Margaret Nagle,
by Walter E. Lombard, Atty.

UNITED STATES PATENT OFFICE.

MARGARET NAGLE, OF ROXBURY, MASSACHUSETTS.

ASH-BARREL HOLDER.

1,091,008.  Specification of Letters Patent.  Patented Mar. 24, 1914.

Application filed November 6, 1912. Serial No. 729,915.

*To all whom it may concern:*

Be it known that I, MARGARET NAGLE, a citizen of the United States of America, and a resident of Roxbury, in the county of Suffolk and State of Massachusetts, have invented certain new and useful Improvements in Ash-Barrel Holders, of which the following is a specification.

This invention relates to receptacles for the disposal of ashes, garbage, and the like, and has for its object the provision of a device of this kind that will be sanitary.

It consists of a framework adapted to support a barrel free from the ground thereby preventing freezing thereto, and confining the open upper end of the barrel in a closed casing thereby preventing the contents of the barrel from being blown about when said contents are ashes, papers, and the like, or from emitting noisome odors therefrom when the barrel contains garbage and similar refuse substances.

It also consists in providing a cover for said casing which may be manually operated when it is desired to dump into the barrel any refuse but which when closed cannot be readily opened by animals to gain access to the contents of the barrel.

It further consists in providing a casing for the barrel which is so constructed that flies and other disease breeding insects are prevented from gaining access to the refuse material within said barrel.

It also consists of a casing in which the barrel may be locked to prevent unauthorized persons from molesting the barrel, thus leaving the contents thereof intact until removed by the proper authorities.

The invention further consists of certain novel features of construction and arrangement of parts which will be fully understood by reference to the description of the drawings and to the claims hereinafter given.

Figure 1:
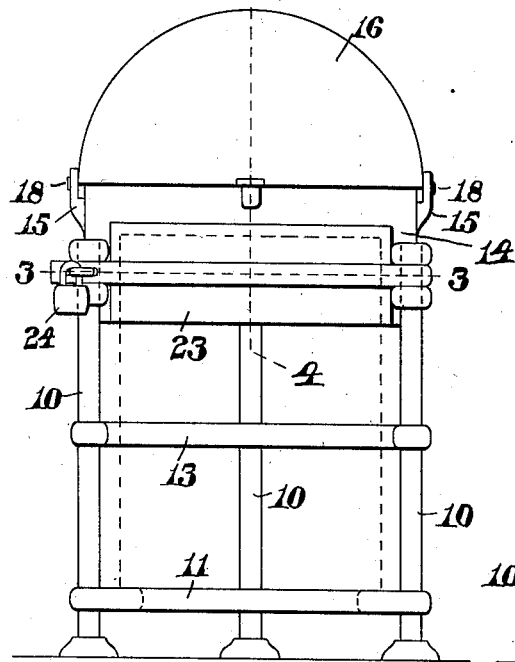
Figure 2:
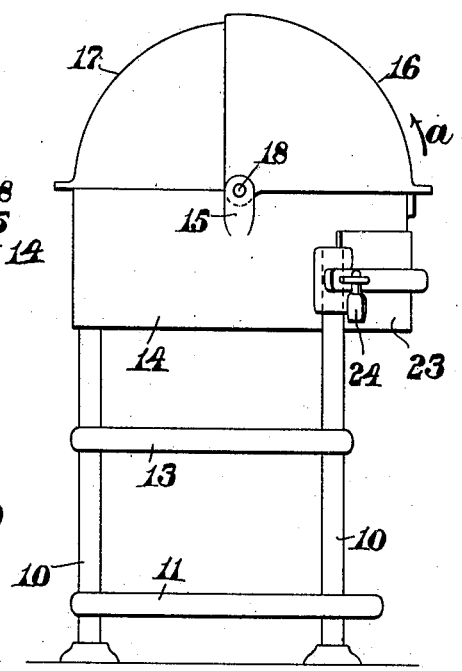
Figure 3:
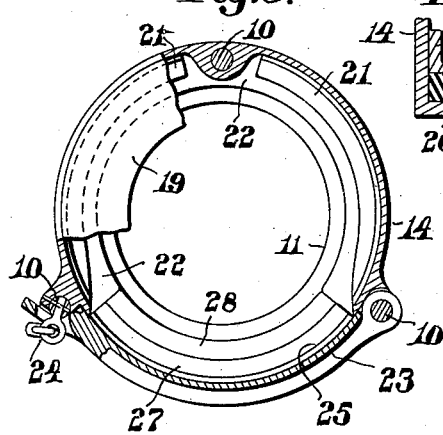
Figures 4, 5:
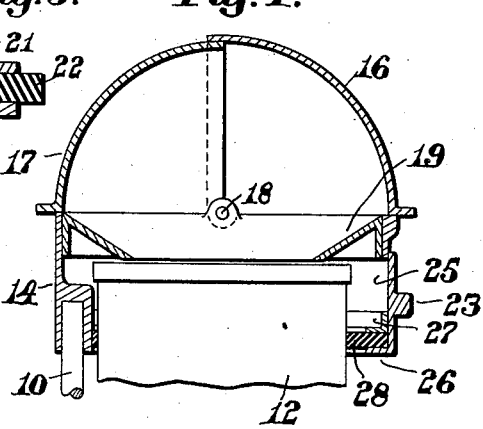

Of the drawings: Figure 1 represents a front elevation of a device embodying the features of the present invention. Fig. 2 represents a side elevation of the same. Fig. 3 represents a horizontal section, the cutting plane being on line 3—3 on Fig. 1. Fig. 4 represents a vertical section of the upper portion of said device, the cutting plane being on line 4—4 on Fig. 1, and Fig. 5 represents a detail of construction to be hereinafter referred to.

Similar characters designate like parts throughout the several figures of the drawings.

In the drawings, 10 represents a plurality of standards having secured thereto a platform 11 to support a barrel or other receptacle 12 adapted to contain refuse. The upper end of the barrel 12 is shown in full lines in Fig. 4, and the entire length thereof is shown in dotted lines in Fig. 1. To provide additional stiffening means these uprights 10 are connected together by the member 13. Secured to the upper ends of said uprights 10 is a jacket or casing 14 provided with diametral ears 15 to which are pivoted the closing members 16 and 17, the pivot pins 18 of which are mounted in said ears 15. Each of the closing members 16 and 17 are formed as portions of a hollow sphere, the closing member 17 being somewhat smaller than the other member 16 so that either one of these closing members may be moved relative to the other about its pivots 18 to obtain access to the interior of the jacket 14 when it is desired to dump refuse into the barrel 12. Normally both of the closing members 16 and 17 are closed as indicated in Figs. 2 and 4 of the drawings, but when desired the member 16 may be moved in the direction of the arrow *a* on Fig. 2 of the drawings, or the member 17 may be moved in the opposite direction in order to gain access to the interior of the barrel 12.

Immediately above the barrel 12 and secured to the interior of the jacket 14 is a downwardly projecting flange 19 having a central opening therein above the open end of the barrel 12 so that when refuse is dumped onto this annular flange 19 it will all be directed into the interior of the barrel 12 and none of it permitted to drop between said barrel and jacket. The jacket 14 is provided at its lower edge with an inwardly extending flange 20 between which and an annular flange 21 secured to the inner wall of said jacket is interposed a yielding member 22 the inner edge of which is adapted to fit the exterior wall of the barrel 12.

Pivoted to one of the uprights 10 is a door 23 the opposite end of which is adapted to be locked to another upright 10 by means of the padlock 24 or similar securing means. This door 23 covers an opening 25 cut into the front wall of the jacket 14, the width of which is slightly more than the diameter of the barrel 12 while the height of said opening is sufficient to permit the removal of the barrel 12 when the door 23 has been opened. The door 23 is provided at its lower edge with an inwardly extending flange 26 corresponding to the flange 20, and between this flange and another flange 27 secured to the inner face of the door 23 is a yielding member 28 similar to the yielding member 22 and in the same plane therewith. When the door 23 is closed these yielding members 22 and 28 form a continuous wall around the barrel 12, thereby preventing the admission of flies and other insects to the interior of the barrel 12 between its outer wall and the interior wall of the jacket 14. It is obvious, therefore, that by means of this device the barrel may be kept closed at all times, thereby preventing the wind from blowing dust and other fine particles around when the barrel is used to contain ashes or similar refuse, and it is also self-evident that flies and other insects are prevented from entering the barrel when it is used for garbage and the like. Moreover, by keeping the device closed at all times the disagreeable odors coming from garbage and other refuse in the barrels is confined within the casing.

The framework is preferably made of considerable weight so that when once positioned it is not readily upset by dogs or other animals as is often the case with the ordinary garbage cans now in use.

One object of having the double cover 16 or 17 is that when dumping ashes or similar refuse into the barrel either one of these covers may be opened according to the direction of the wind so that the dust may be blown into and not away from the barrel 12. The locked door 23 prevents the removal of the barrel 12 except by the proper authorities. By elevating the platform 11 the freezing of the barrel 12 to the ground is obviated.

It is believed that the many advantages of this invention will be fully understood from the foregoing description.

Having thus described my invention, I claim:

1. In a device of the class described, the combination of an open framework consisting in part of a plurality of vertical members; a platform secured thereto above the lower ends of said members, adapted to support a barrel; a cylindrical jacket on the upper part of said framework adapted to surround the upper end of the barrel and provided with an opening in its lower edge; a door for closing said opening; and a hood above said jacket.

2. In a device of the class described, the combination of an open framework consisting in part of a plurality of vertical members; a platform secured thereto adapted to support a barrel; a cylindrical jacket on said framework having an inwardly extending flange adapted to surround and contact with the upper end of the barrel and provided with an opening in its lower edge; a door for closing said opening; and a hood above and pivoted to said jacket adapted to be moved about said pivot to give access to said barrel.

3. In a device of the class described, the combination of a framework; a platform secured thereto adapted to support a barrel; a cylindrical jacket on said framework adapted to surround the upper end of the barrel and provided with an opening in its lower edge; an annular flange extending downwardly from the upper inner wall of said jacket over the edge of said barrel; a door for closing said opening; and a hood above said jacket.

4. In a device of the class described, the combination of a framework; a platform secured thereto adapted to support a barrel; a cylindrical jacket on said framework adapted to surround the upper end of the barrel and provided with an opening in its lower edge; an annular flange extending downwardly from the upper inner wall of said jacket; means on said jacket for positioning a barrel beneath said downwardly extending flange; a door for closing said opening; and a hood above said jacket.

5. In a device of the class described, the combination of a plurality of vertical members; an annular barrel supporting platform secured to said vertical members above the lower ends thereof; a stiffening member connecting the front vertical members with a rear vertical member; a cylindrical member secured to the upper ends of said vertical members having a front opening therein extending upwardly from its lower edge to a point below its upper edge; a door for closing the front opening; and a hood for said cylindrical jacket adapted to give access to said barrel.

Signed by me at Roxbury, Massachusetts, this 4th day of November, 1912.

MARGARET NAGLE.

Witnesses:
WILLIAM J. NAGLE,
FRANK J. NAGLE.

---

Copies of this patent may be obtained for five cents each, by addressing the "Commissioner of Patents, Washington, D. C."